Patented July 22, 1952

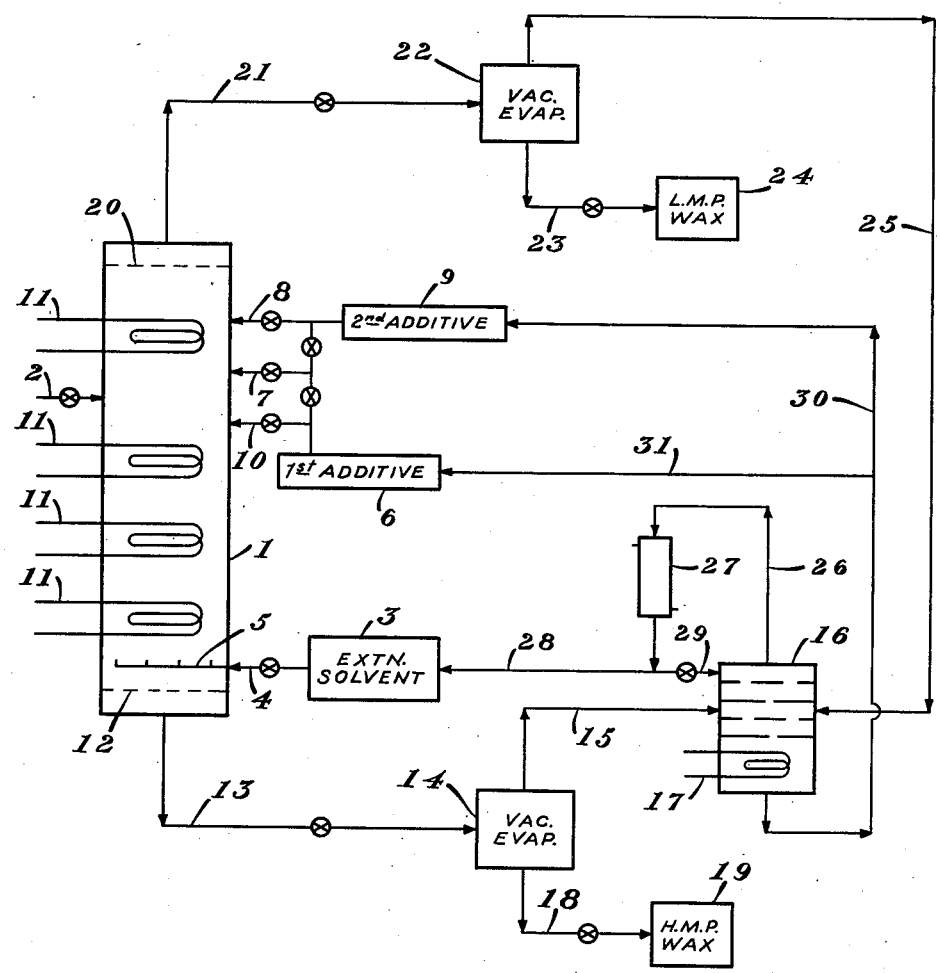

2,604,434

UNITED STATES PATENT OFFICE 2,604,434

SOLVENT FRACTIONATION OF WAX-CONTAINING MIXTURES

Edgar W. Clarke, Laurel Springs, N. J., assignor to The Atlantic Refining Company, Philadelphia, Pa., a corporation of Pennsylvania Original application September 16, 1947, Serial No. 774,230. Divided and this application November 5, 1949, Serial No. 125,724

3 Claims. (Cl. 196—17)

The present invention relates to the treatment of oily waxes, and more particularly to the separation of wax-containing mixtures into fractions of higher and lower melting point, using a solvent comprising acetone and an additive comprising ethylene glycol mono-methyl ether.

This application is a division of copending application Serial Number 774,230, filed September 16, 1947, now Patent No. 2,578,510, and entitled "Solvent Fractionation of Wax-Containing Mixtures."

The present invention is especially applicable to the de-oiling of hydrocarbon waxes containing not more than about 70% of oil, and to the separation of wax mixtures of low oil content into fractions of different melting point. The process of the present invention may be applied in the refining, purification, or separation of wax stocks such as petroleum slack wax, crude microcrystalline wax, paraffin waxes, petrolatum wax, montan wax, ceresin, ozokerite, waxes from the destructive or non-destructive hydrogenation of mineral oil, synthetic hydrocarbon oil, shale oil, coal, and waxes produced synthetically by the catalytic reaction of hydrocarbons, or waxes derived from the modified Fischer-Tropsch reaction of carbon monoxide and hydrogen. The process of this invention is especially applicable in the separation of wax mixtures containing color bodies and oil into a higher melting wax fraction of light color and low oil content, and a lower melting wax fraction of darker color and containing most of the oil originally present in the wax mixture.

In accordance with this invention, a wax-containing mixture is separated into fractions of higher and lower melting point by countercurrently contacting the wax-containing mixture in an extraction zone with an extraction solvent and a solvent additive or additives at a temperature such that two liquid phases are formed, one comprising the higher melting wax fraction with minor amounts of solvent and additive, and the other comprising the lower melting wax fraction with major amounts of solvent and additive, separating the liquid phases from one another, and removing the solvent and additive from each. The extraction solvent employed may have a density less than that of the wax, while the additive or additives may have a density greater than that of the wax. However, when the additive or additives are partially immiscible with the extraction solvent and are less dense than such solvent or the wax, the additive or additives will flow countercurrent to the extraction solvent and will appear with that liquid phase comprising the higher melting wax fraction. The success of the process depends upon the control of the temperature throughout the extraction zone and upon the regulation of the proportions of solvent and additive used, and the points of introduction of the wax-containing mixture, the solvent, and the additive into the extraction zone.

The extraction solvent may be defined as an agent which, when intimately mixed with a wax-containing mixture, forms two liquid phases or layers, one comprising a raffinate phase containing mostly wax of higher melting point than the untreated wax and a portion of the solvent, and the other comprising an extract phase containing mostly solvent, and wax of lower melting point than the untreated wax, as well as major portion of the color bodies and oil originally present in the untreated wax.

The solvent additive may be defined as an agent used in conjunction with the extraction solvent for the purpose of modifying the characteristics of the extraction solvent. The additive may lower the temperature at which solid wax precipitates out of the extraction solvent, or it may raise the miscibility temperature of the extraction solvent with the wax. However, the additive chosen for a particular extraction solvent must not excessively lower the selectivity of the extraction solvent at the temperature of extraction.

The extraction solvent may be employed in amounts ranging from 1 to 5 volumes of solvent per volume of untreated wax stock, while the additive or additives may be used in amounts ranging from 0.05 to 1 volume per volume of untreated wax.

The extraction solvent which may be employed in accordance with the present invention comprises acetone.

The solvent additive or additives, which are usually employed in amounts constituting not more than 50% by volume of the extraction solvent, comprise ethylene glycol mono-methyl ether.

The process of the present invention may be carried out in a multi-stage batch countercurrent extraction system or in a continuous countercurrent extraction system, preferably a tower provided with perforated baffles or containing a packing material such as ceramic shapes, tiles, metal wool, or fragments of ceramic material, glass, pumic, Carborundum, or concrete. For most effective operation, a temperature gradient is maintained in the system by means of heating or cooling coils or jackets, the temperature increasing in the direction of flow of the raffinate or higher melting wax fraction.

The present invention may be further understood with reference to the accompanying drawing which illustrates diagrammatically a continuous extraction system suitable for carrying out the process.

Referring to the drawing, a wax-containing mixture is continuously introduced, in liquid condition, into the extraction tower 1 through valve controlled pipe 2 at a rate of 100 volumes per hour. An extraction solvent comprising acetone is continuously introduced from vessel 3 by means of valve-controlled pipe 4 and manifold 5 into the lower section of the tower above the raffinate outlet at a rate of 400 volumes per hour. The first additive comprising ethylene glycol mono-methyl ether is continuously introduced from vessel 6 through valve-controlled pipe 7 into the extraction tower 1 above the wax inlet at a rate of 40 volumes per hour. The second additive also comprising ethylene glycol mono-methyl ether is continuously introduced from vessel 9 by valve-controlled pipe 8 into the extraction tower 1 between the point of introduction of the first additive and the outlet of the extract phase, at a rate of 40 volumes per hour. An intimate countercurrent contacting of the wax stock, the extraction solvent, and the additives is effected in tower 1, the temperature being controlled in the tower by means of coils 11 through which a heating or cooling medium is circulated as required. The temperature, in the present case, is held constant, for example, at 85° F., the contents being entirely in the liquid phase. The wax stock, being subjected to the action of the solvent and additives, is caused to separate by solvent action into two fractions, the higher melting fraction wax passing downwardly through the tower together with a minor amount of dissolved extraction solvent and additive, and being withdrawn therefrom below the level of the dotted line 12 representing the higher melting wax phase relatively free of entrained, immiscible solvent and additive. The raffinate phase comprising the higher melting wax and dissolved solvent and additive is passed from the bottom of tower 1 through valve-controlled pipe 13 into a vacuum evaporator or still 14 wherein the solvent and additive is removed from the higher melting wax by vaporization, the solvent and additive vapors passing through pipe 15 into fractionating tower 16 provided with a reboiler or heating coil 17, while the higher melting wax is drawn from the bottom of evaporator 14 and delivered by valve-controlled pipe 18 into storage vessel 19. Such wax fraction was white in color, and had a substantially higher melting point and a lower oil content than the wax stock originally charged.

The extract phase comprising the lower melting wax fraction, color bodies, oil, and the major portion of the extraction solvent and additives is withdrawn from the upper section of tower 1 above the level of the dotted line 20 representing the extract phase relatively free of entrained, higher melting wax. The extract phase is delivered by valve-controlled pipe 21 into a vacuum evaporator or still 22 wherein the solvent and additives are vaporized from the lower melting wax, the latter being drawn from the bottom of the evaporator and passed by valve-controlled pipe 23 to storage vessel 24. The lower melting wax was brown in color and had a substantially lower melting point and a higher oil content than the original waxy mixture.

The solvent and additive vapors are passed from the top of evaporator 22 through pipe 25 into fractionating tower 16, wherein such vapors together with those introduced through pipe 15, are fractionated, the extraction solvent, i. e., acetone, being taken overhead as vapor through pipe 26, condensed in condenser 27 and returned by pipe 28 to solvent storage vessel 3. A portion of the condensed solvent may be returned to the top of tower 16 by valve-controlled pipe 29 as reflux. The additive, i. e., ethylene glycol mono-methyl ether, separated from the acetone by fractionation in tower 16, is taken from the bottom of tower 16, as liquid, and is returned by pipes 30 and 31 to the additive storage vessels 6 and 9.

Depending upon the temperature of operation, the first additive may be introduced somewhat below the point of introduction of the liquefied wax stock, for example, by means of valve-controlled pipe 10 rather than through valve-controlled pipe 7, in which case the second additive may be admitted through either or both of valve-controlled pipes 7 and 8 above the point of introduction of the wax stock. In general, the raffinate wax phase withdrawn from the extraction tower will contain from 5% to 25% of solvent and additive, while the extract wax phase will contain from 55% to 90% of solvent and additive.

In the event that the extraction is to be carried out in a multi-stage batch countercurrent system, for example, a four-stage system using the solvent and additives specifically set forth above, the wax stock would be introduced into the first stage extractor, the extraction solvent (acetone) would be introduced into the fourth stage extractor, and the first additive, i. e., ethylene glycol mono-methyl ether, would be introduced into the first stage extractor. The second additive, e. g., ethylene glycol mono-methyl ether, would be introduced into the second stage extractor. The extract phase is withdrawn from the first stage, while the raffinate phase would be removed from the fourth stage extractor. The temperature would increase progressively from the first stage to the fourth stage, using the waxy stock, solvent, and additives described hereinabove. It is to be understood, of course, that the quantities and composition of the solvent and of the additives may be varied within certain limits.

Exemplary of the solvent and additive materials which may be used in accordance with this invention is the following, the quantities being volumes per unit volume of wax stock.

| Extraction Solvent | 1st Additive | 2nd Additive |
| --- | --- | --- |
| acetone 4±0.5 vols | ethylene glycol mono-methyl ether 0.4±0.1 vols. | ethylene glycol mono-methyl ether 0.4±0.1 vols. |

The present invention is further illustrated by the following example, which, however, is not to be construed as limiting the scope thereof:

(1) A slack wax having a melting point of 113° F. and an oil content of 24.2% by weight was extracted in a system similar to that shown in the accompanying drawing, the extraction solvent comprising 4 volumes of acetone, the first additive comprising 0.4 volume of ethylene glycol mono-methyl ether, and the second additive comprising 0.4 volume of ethylene glycol mono-methyl ether. The slack wax was introduced into tower 1 by pipe 2, the solvent by pipe 4 and manifold 5, the first additive by pipe 7 and the second additive by pipe 8. The temperature in the extraction tower was maintained constant at 85° F. After countercurrent contacting and removal of the raffinate phase from the bottom of the tower, and the extract phase from the top of the tower, the solvent and additives were recovered from the wax fractions by vacuum evaporation and fractionation. The results are shown in the following table:

|  | Charge Wax | Raffinate Wax | Extract Wax |
|---|---|---|---|
| Weight Per Cent Yield | 100 | 52.9 | 47.1 |
| Melting Point | 113.1 | 128.9 | 82.3 |
| Oil Content, Weight Per Cent | 24.2 | 0.3 | 51.2 |
| Refractive Index at 176° F | 1.43625 | 1.43087 | 1.44809 |
| A. P. I. Gravity | 40.5 | 41.2 | 34.4 |
| Color | Brown | White | Dark Brown |
| Firmness | Nil | Good | Nil |
| Tackiness | Poor | Moderate | Poor |
| Plasticity | Too Soft | Good | Too Soft |
| Fiber Length | Short | Long | Short |
| Flexibility | Poor | Good | Nil |

Where the extraction operation is conducted in a tower, it has been found that a tower having a height of about 40 feet and a diameter of 6 feet is satisfactory. The tower is provided with suitable packing to within about 4 feet of the top and bottom thereof, such spaces functioning as quiescent zones in which entrained materials are permitted to separate from the raffinate and extract phases, respectively. In such a tower, the wax stock is charged at a point about 13 feet from the top thereof, or approximately ⅓ the distance from the top of the tower. The extraction solvent is charged just above the lower level of the packing, for example, 3 to 4 feet from the bottom of the tower. The first additive may be introduced adjacent the point of introduction of the wax stock, for example, 2 feet above or below the wax inlet. The second additive is introduced approximately 2 feet above the point of introduction of the first additive. These values may be altered somewhat, depending upon the tower design, the solvent and additives used, and the temperatures maintained at various levels in the tower. The raffinate phase is withdrawn from the bottom of the tower, and the extract phase from the top thereof, the extraction solvent being less dense than the wax stock.

I claim:

1. The method of separating a wax-containing mixture into fractions of higher and lower melting point, which comprises countercurrently contacting said wax-containing mixture in an extraction zone with an extraction solvent and solvent additives at a temperature such that two immiscible liquid phases are formed, one comprising the higher melting wax fraction containing solvent and additives, and the other comprising solvent and additives and the lower melting wax fraction, separating the phases from one another, and removing the solvent and additives from each, the solvent being introduced into the extraction zone near the point of withdrawal of the higher melting wax fraction, the first additive being introduced adjacent the point of introduction of the wax-containing mixture, and the second additive being introduced between the point of introduction of the first additive and the point of withdrawal of the lower melting wax fraction, the solvent comprising 3.5 to 4.5 volumes of acetone per volume of wax-containing mixture, the first additive comprising 0.3 to 0.5 volume of ethylene glycol mono-methyl ether per volume of wax-containing mixture, and the second additive comprising 0.3 to 0.5 volume of ethylene glycol mono-methyl ether per volume of wax-containing mixture.

2. The method of separating a wax-containing mixture into fractions of higher and lower melting point, which comprises countercurrently contacting said wax-containing mixture in an extraction zone with an extraction solvent and solvent additives at a temperature such that two immiscible liquid phases are formed, one comprising the higher melting wax fraction with minor amounts of solvent and additives, and the other comprising the lower melting wax fraction with major amounts of solvent and additives, separating the phases from one another, and removing the solvent and additives from each, the solvent being introduced into the extraction zone near the point of withdrawal of the higher melting wax fraction, the first additive being introduced between the point of introduction of the wax-containing mixture and the point of withdrawal of the lower melting wax fraction, and the second additive being introduced between the point of introduction of the first additive and the point of withdrawal of the lower melting wax fraction, the solvent comprising 3.5 to 4.5 volumes of acetone per volume of wax-containing mixture, the first additive comprising 0.3 to 0.5 volume of ethylene glycol mono-methyl ether per volume of wax-containing mixture, and the second additive comprising 0.3 to 0.5 volume of ethylene glycol mono-methyl ether per volume of wax-containing mixture.

3. The method of separating a wax-containing mixture into fractions of higher and lower melting point, which comprises countercurrently contacting said wax-containing mixture in an extraction zone with an extraction solvent and solvent additives at a temperature such that two immiscible liquid phases are formed, one comprising the higher melting wax fraction containing solvent and additives, and the other comprising solvent and additives and the lower melting wax fraction, separating the phases from one another, and removing the solvent and additives from each, the solvent being introduced into the extraction zone near the point of withdrawal of the higher melting wax fraction, the first additive being introduced adjacent the point of introduction of the wax-containing mixture, and the second additive being introduced between the point of introduction of the first additive and the point of withdrawal of the lower melting wax fraction, the solvent comprising 3.5 to 4.5 volumes of acetone per volume of wax-containing mixture, the first additive comprising 0.3 to 0.5 volume of ethylene glycol mono-methyl ether per volume of wax-containing mixture, and the second additive comprising 0.3 to 0.5 volume of ethylene glycol mono-methyl ether per volume of wax-containing mixture.

EDGAR W. CLARKE.

REFERENCES CITED

The following references are of record in the file of this patent:

UNITED STATES PATENTS

| Number | Name | Date |
|---|---|---|
| 2,017,432 | Bahlke | Oct. 15, 1935 |
| 2,063,369 | Diggs et al. | Dec. 8, 1936 |
| 2,160,930 | Whiteley et al. | June 6, 1939 |
| 2,178,078 | Martin | Oct. 31, 1939 |
| 2,541,338 | Clarke | Feb. 13, 1951 |